(12) United States Patent
Bastide et al.

(10) Patent No.: US 9,754,051 B2
(45) Date of Patent: Sep. 5, 2017

(54) SUGGESTING A MESSAGE TO USER TO POST ON A SOCIAL NETWORK BASED ON PRIOR POSTS DIRECTED TO SAME TOPIC IN A DIFFERENT TENSE

(71) Applicant: International Business Machines Corporation, Armonk, NY (US)

(72) Inventors: Paul R. Bastide, Boxford, MA (US); Lisa Seacat DeLuca, Baltimore, MD (US); Lydia M. Do, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 14/631,081

(22) Filed: Feb. 25, 2015

(65) Prior Publication Data

US 2016/0246806 A1    Aug. 25, 2016

(51) Int. Cl.
*G06F 15/16* (2006.01)
*G06F 17/30* (2006.01)
*H04L 12/58* (2006.01)
*H04L 29/08* (2006.01)
*G06Q 50/00* (2012.01)

(52) U.S. Cl.
CPC ......... *G06F 17/3097* (2013.01); *G06Q 50/01* (2013.01); *H04L 51/32* (2013.01); *H04L 67/22* (2013.01)

(58) Field of Classification Search
CPC ..... G06F 17/3097; G06Q 50/01; H04L 67/22; H04L 51/32
See application file for complete search history.

(56) References Cited

U.S. PATENT DOCUMENTS

| 8,903,927 B2 | 12/2014 | Chen et al. |
| 2013/0073280 A1 | 3/2013 | O'Neil et al. |
| 2014/0136323 A1* | 5/2014 | Zhang ............... G06F 17/30483 705/14.53 |

(Continued)

OTHER PUBLICATIONS

IBM, "SPSS Text Analytics for Surveys," http://www-03.ibm.com/software/products/en/spss-text-analytics-surveys, 2013, pp. 1-3.

(Continued)

*Primary Examiner* — Brian Whipple
(74) *Attorney, Agent, or Firm* — Robert A. Voigt, Jr.; Winstead, P.C.

(57) ABSTRACT

A method, system and computer program product for improving the quality of the posts in a social network. A topic of a post to a social network environment is identified using natural language processing. The tense of the post directed to the identified topic is detected using natural language processing. The post is transformed to a suggested post of a second tense directed to the same topic to the user using natural language processing. A suggested message to be posted by the user to the social network in a third tense (e.g., past tense) based on the posts directed to the identified topic in the first and second tenses (e.g., future and present tenses) is generated using natural language processing thereby forming a past/present/future pairing of posts. By forming a past/present/future pairing of posts, a more complete and understandable view of the user's personal history may be obtained.

15 Claims, 4 Drawing Sheets

(56) References Cited

U.S. PATENT DOCUMENTS

2015/0312199 A1* 10/2015 Bastide ............. G06F 17/30598
715/752
2016/0021053 A1* 1/2016 Bastide ................... H04L 51/32
709/206

OTHER PUBLICATIONS

IBM, "SPSS Statistics," http://www-01.ibm.com/software/analytics/spss/products/statistics, 2013, pp. 1-2.
Wikipedia, "Natural Language Processing," http://en.wikipedia.org/wiki/Natural_language_processing, 2014, pp. 1-11.
Disclosed Anonymously, "Method for Timed Evolution of a Message," IP.com No. IPCOM000235585D, Mar. 10, 2014, pp. 1-5.

* cited by examiner

SUGGESTING A MESSAGE TO USER TO POST ON A SOCIAL NETWORK BASED ON PRIOR POSTS DIRECTED TO SAME TOPIC IN A DIFFERENT TENSE

TECHNICAL FIELD

The present invention relates generally to social network services, and more particularly to improving the quality of the posts (e.g., updates on a social network) by suggesting a message to a user to post on a social network based on prior posts directed to the same topic in a different tense.

BACKGROUND

A social network service is an online service, platform or site that focuses on building social networks or social relations among people (e.g., those who share interests and/or activities). A social network service essentially consists of a representation of each user (often a profile), his/her social links, and a variety of additional services. Most social network services are web-based and provide means for users to interact over the Internet, such as by e-mail and instant messaging. Social networking sites allow users to share ideas, activities, events, and interests within their individual networks.

Social networking sites (e.g., Facebook®) present to a particular user the posts and stories by other users in a social networking feed (referred to as a "news feed"). When a user posts a message (e.g., update) on a social network site, it is a snapshot in time and disassociated with the other posts made by the user. For example, the user may post a message, such as "Going to Franco's Restaurant," followed by the posts of "These shoes are terrible" and "I sold a suite of software." As a result, these posts provide the user's followers (e.g., friends in the user's social network) a disjointed personal history of the user thereby providing an incomplete view of the user's personal history.

BRIEF SUMMARY

In one embodiment of the present invention, a method for improving the quality of posts in a social network comprises monitoring posts posted in a social network environment. The method further comprises identifying a topic of a first post from the monitored posts. The method additionally comprises detecting a first tense of the first post directed to the topic. Furthermore, the method comprises transforming the first post of the first tense to a second post of a second tense directed to the identified topic. Additionally, the method comprises presenting the second post to a user as a recommended post to be posted to the social network. In addition, the method comprises associating the first and second posts directed to the topic in the first and second tenses, respectively. The method further comprises generating, by a processor, a third post directed to the topic in a third tense based on the first and second posts directed to the topic in the first and second tenses, respectively, thereby forming a past/present/future pairing of posts, where the third post is a restatement of the first and second posts. Furthermore, the method comprises presenting the third post to the user as a recommended post to be posted to the social network.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for improving the quality of the posts in a social network. In one embodiment of the present invention, the messages posted by a user in a social network environment (e.g., forum, social networking community, activity stream, wall, profile) are monitored. A topic of a post from the monitored posts is identified using natural language processing. A tense (e.g., past tense, present tense, future tense) of the post directed to the identified topic is detected using natural language processing. For example, the phrase "am going" may indicate a future tense. The post is transformed to a suggested post of a second tense directed to the same topic to the user using natural language processing in response to a time based or a user triggered event. A "user triggered event" refers to actions performed by the user that involve posting an update to a previous post that may necessitate a message to be recommended to the user to be posted to the social network to clarify the update. A "time based event" refers to events that cause a message to be recommended to the user to post to a social network based on a prior post(s) at a particular day/time based on time-related information extracted from the prior post(s). For example, the post of "I am going to Jane's on Tuesday" (future tense) may be transformed to "I am at Jane's" (present tense) in response to the day being Tuesday (time based event). The suggested post is presented to the user as a recommended message to be posted to the social network. The posts directed to the same topic in the two tenses (e.g., future and present) are then associated. For example, the posts of "I am going to Jane's on Tuesday" and "I am at Jane's with Sue" may be associated with one another since they are both directed to the same topic (going to Jane's house) which may be determined based on identifying keywords (e.g., "Jane's") using natural language processing. A suggested message to be posted by the user to the social network in a third tense (e.g., past tense) based on the posts directed to the identified topic in the first and second tenses (e.g., future and present tenses) is generated using natural language processing thereby forming a past/present/future pairing of posts. For example, the suggested message of "I was at Jane's with Sue" (past tense) may be generated based on the posts of "I am going to Jane's on Tuesday" (future tense) and "I am at Jane's with Sue" (present tense). The suggested message is presented to the user as a recommended message to be posted to the social network. By forming a past/present/future pairing of posts, a more complete and understandable view of the user's personal history may be obtained.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
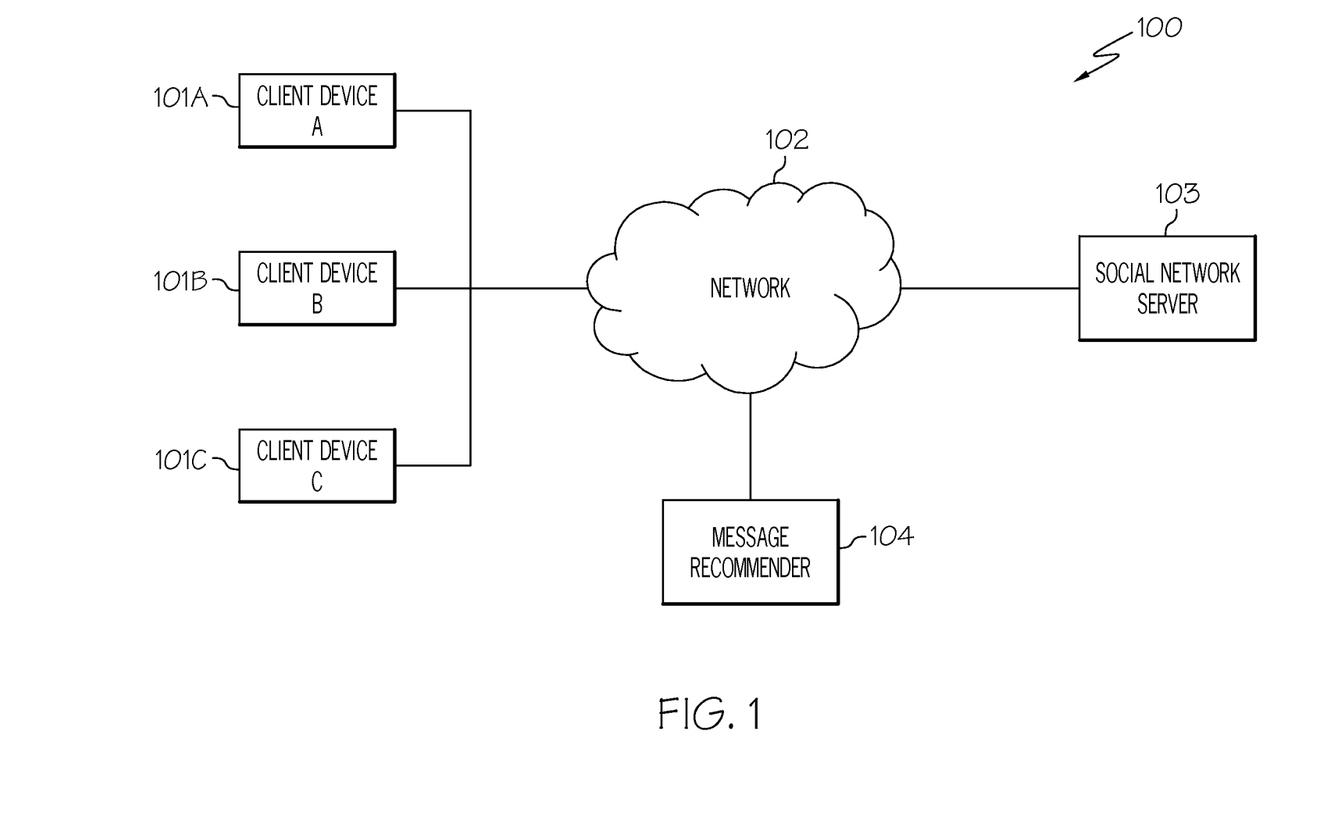
FIG. 1 illustrates a social network system configured in accordance with an embodiment of the present invention.

Referring now to the figures in detail, FIG. 1 illustrates a social network system 100 configured in accordance with an embodiment of the present invention. Referring to FIG. 1, social network system 100 includes a community of users using client devices 101A-101C (identified as "Client Device A," "Client Device B," and "Client Device C," respectively, in FIG. 1) to be involved in social network system 100. Client devices 101A-101C may collectively or individually be referred to as client devices 101 or client device 101, respectively. Client device 101 may be a portable computing unit, a Personal Digital Assistant (PDA), a smartphone, a laptop computer, a mobile phone, a navigation device, a game console, a desktop computer system, a workstation, an Internet appliance and the like.

Client devices 101 may participate in a social network by communicating (by wire or wirelessly) over a network 102, which may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a social network server 103, which may be a web server configured to offer a social networking and/or microblogging service, enabling users of client devices 101 to send and read other users' posts. "Posts," as used herein, include any one or more of the following: text (e.g., messages, comments, sub-comments and replies), audio, video images, etc. Social network server 103 is connected to network 102 by wire or wirelessly. While FIG. 1 illustrates a single social network server 103, it is noted for clarity that multiple servers may be used to implement the social networking and/or microblogging service.

System 100 further includes a message recommender 104 connected to network 102 by wire or wirelessly. Message recommender 104 is configured to improve the quality of the posts in a social network, such as by suggesting a message to a user (e.g., user of client 101A) to post on the user's social network based on prior posts directed to the same topic in a different tense as discussed in further detail below. A description of the hardware configuration of message recommender 104 is provided below in connection with FIG. 2.

System 100 is not to be limited in scope to any one particular network architecture. System 100 may include any number of clients 101, networks 102, social network servers 103 and message recommenders 104. Furthermore, in one embodiment, message recommender 104 may be part of client device 101 or social network server 103.

Figure 2:
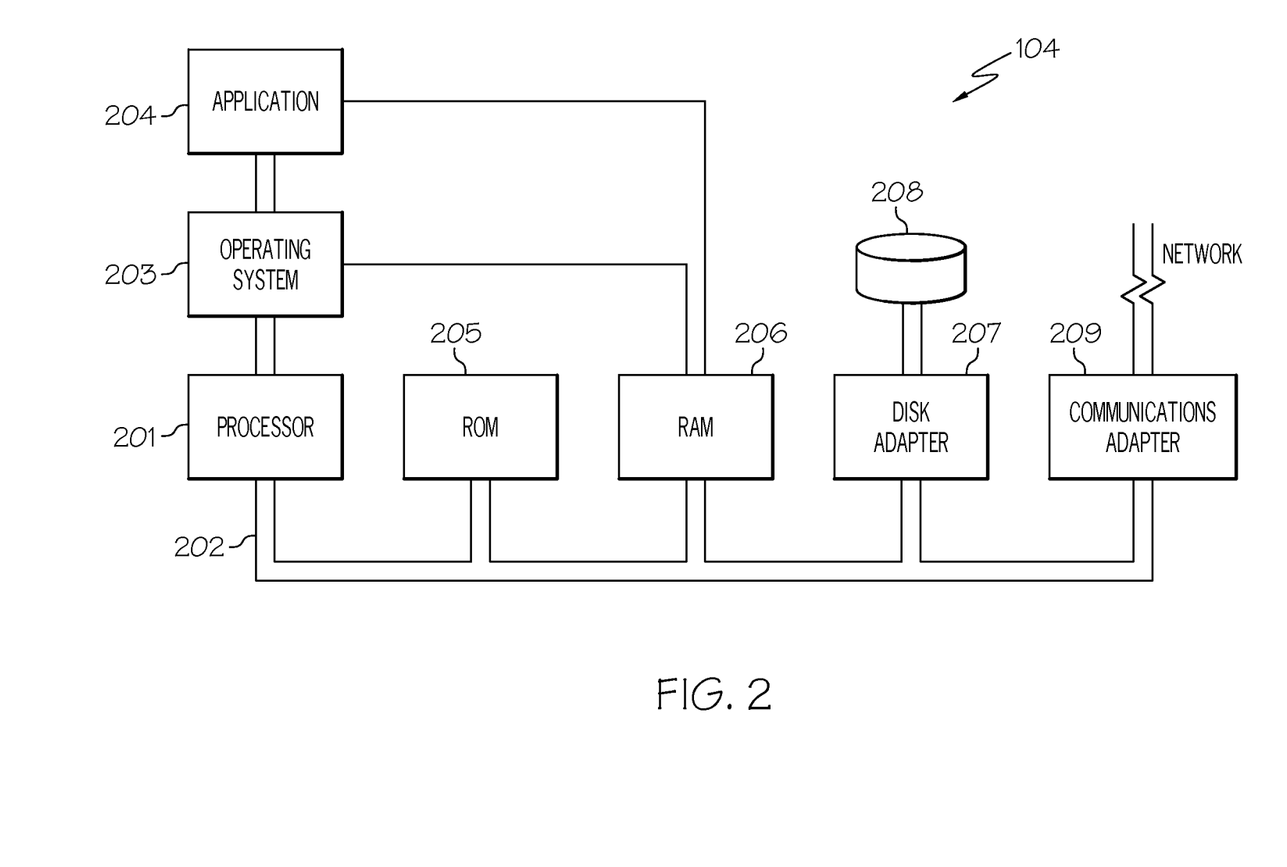
FIG. 2 illustrates a hardware configuration of a message recommender configured in accordance with an embodiment of the present invention.

Referring now to FIG. 2, FIG. 2 illustrates a hardware configuration of message recommender 104 (FIG. 1) which is representative of a hardware environment for practicing the present invention. Referring to FIG. 2, message recommender 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for improving the quality of the posts in a social network by suggesting a message to a user (e.g., user of client 101A) to post on the user's social network based on prior posts directed to the same topic in a different tense as discussed further below in association with FIGS. 3A-3B.

Referring again to FIG. 2, read-only memory ("ROM") 205 is coupled to system bus 202 and includes a basic input/output system ("BIOS") that controls certain basic functions of message recommender 104. Random access memory ("RAM") 206 and disk adapter 207 are also coupled to system bus 202. It should be noted that software components including operating system 203 and application 204 may be loaded into RAM 206, which may be message recommender's 104 main memory for execution. Disk adapter 207 may be an integrated drive electronics ("IDE") adapter that communicates with a disk unit 208, e.g., disk drive. It is noted that the program for improving the quality of the posts in a social network by suggesting a message to a user (e.g., user of client 101A) to post on the user's social network based on prior posts directed to the same topic in a different tense, as discussed further below in association with FIGS. 3A-3B, may reside in disk unit 208 or in application 204.

Message recommender 104 may further include a communications adapter 209 coupled to bus 202. Communications adapter 209 interconnects bus 202 with an outside network (e.g., network 102 of FIG. 1) thereby allowing message recommender 104 to communicate with client devices 101 and social network server 103.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, social networking sites (e.g., Facebook®) present to a particular user the posts and stories by other users in a social networking feed (referred to as a "news feed"). When a user posts a message (e.g., update) on a social network site, it is a snapshot in time and disassociated with the other posts made by the user. For example, the user may post a message, such as "Going to Franco's Restaurant," followed by the posts of "These shoes are terrible" and "I sold a suite of software." As a result, these posts provide the user's followers (e.g., friends in the user's social network) a disjointed personal history of the user thereby providing an incomplete view of the user's personal history.

The principles of the present invention provide a means for improving the quality of the posts in a social network by providing a more complete view of the user's personal history by suggesting a message to a user to post on the user's social network based on prior posts directed to the same topic in a different tense as discussed below in association with FIGS. 3A-3B.

Figure 3A:
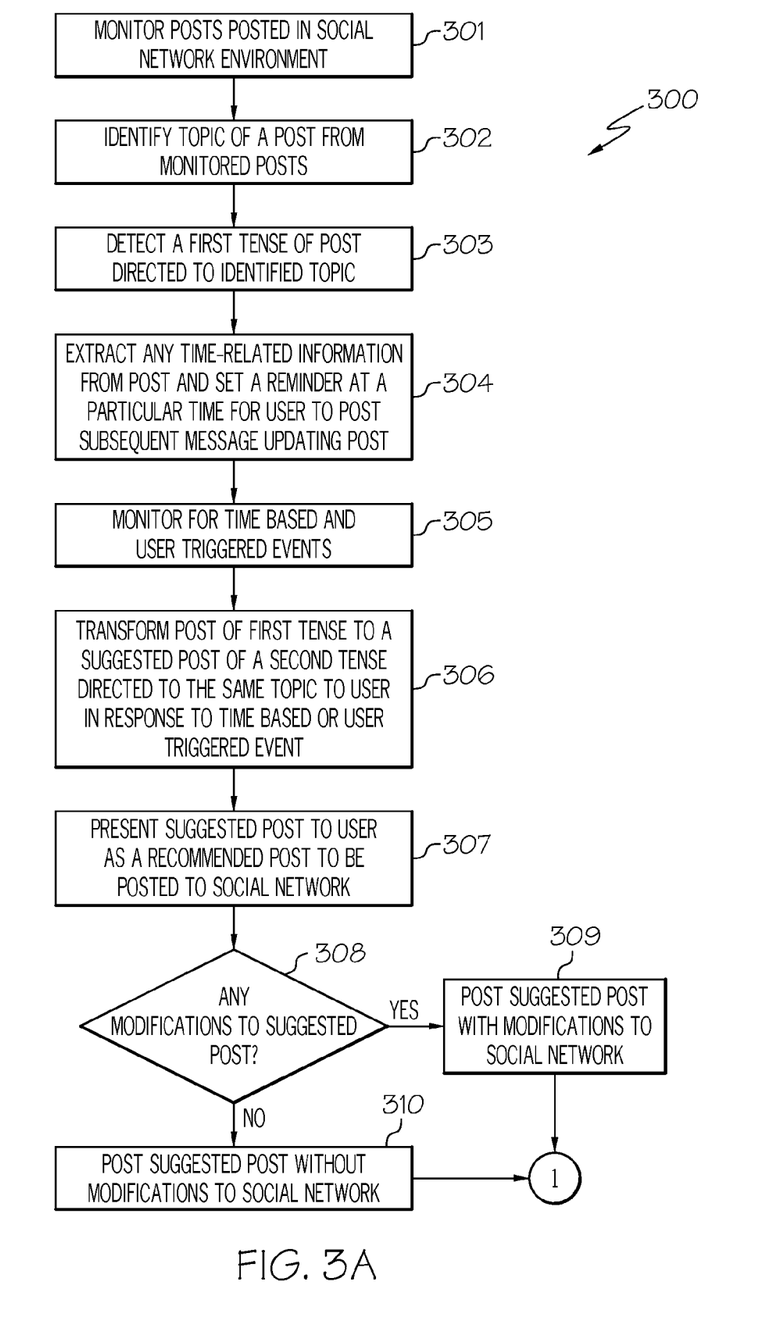
FIGS. 3A-3B are a flowchart of a method for improving the quality of the posts in a social network by providing a more complete view of the user's personal history by suggesting a message to a user to post on the user's social network based on prior posts directed to the same topic in a different tense in accordance with an embodiment of the present invention.
Figure 3B:
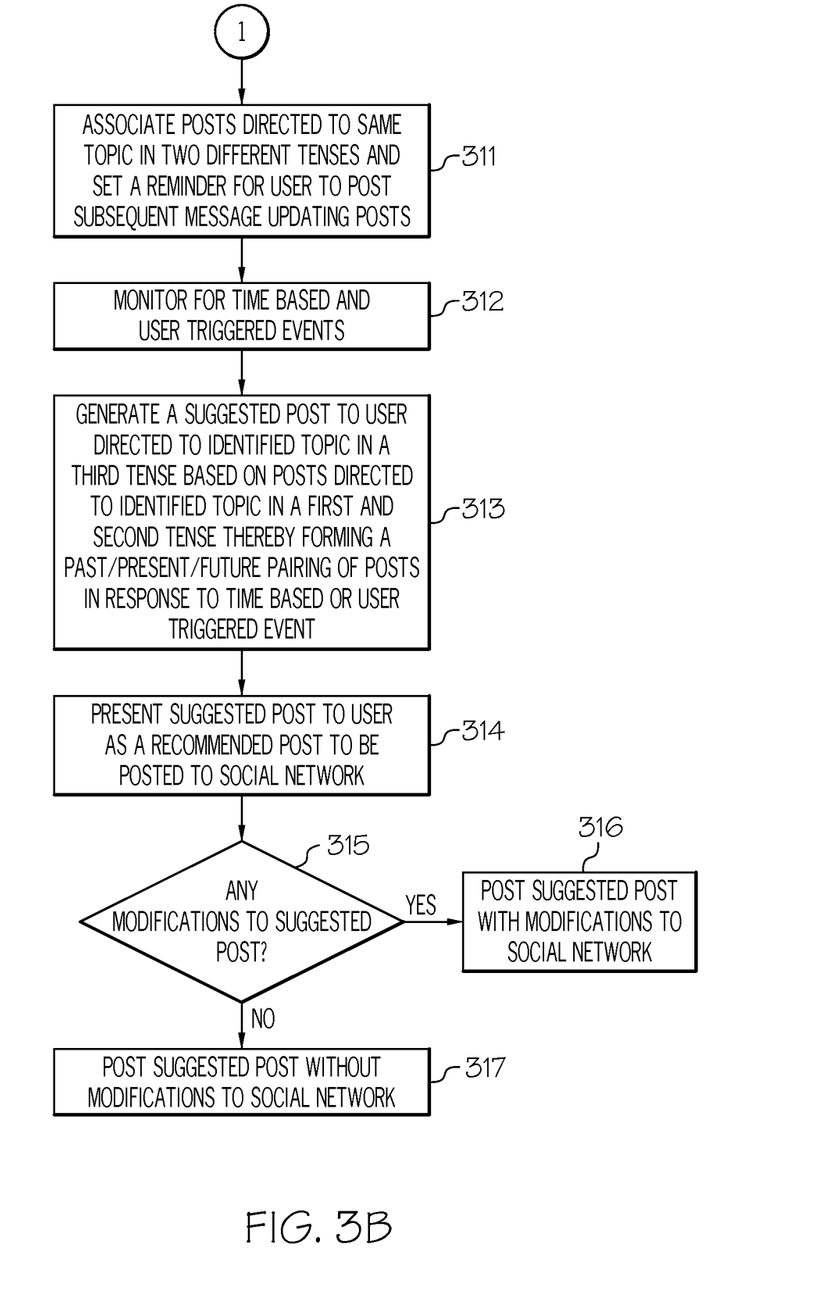

FIGS. 3A-3B are a flowchart of a method for improving the quality of the posts in a social network by providing a more complete view of the user's personal history by suggesting a message to a user (e.g., user of client device 101A) to post on the user's social network based on prior posts directed to the same topic in a different tense in accordance with an embodiment of the present invention.

Referring to FIG. 3A, in conjunction with FIGS. 1-2, in step 301, message recommender 104 monitors the messages ("posts") posted by a user (e.g., user of client device 101A) in a social network environment (e.g., forum, social networking community, activity stream, wall, profile). In one embodiment, the posts may be monitored in real-time in the social network environment. In another embodiment, the posts may be stored in a data structure (e.g., table, database) and later analyzed by message recommender 104 as discussed below.

In step 302, message recommender 104 identifies a topic of a post from the monitored posts. In one embodiment, message recommender 104 identifies a topic from a post using natural language processing. A "topic" refers to a subject of a conversation or discussion in the posted message. For example, message recommender 104 may identify a topic in the posted message by focusing on keywords, such as "travel," "sports," and "cars," when analyzing the message for the topic using natural language processing.

In step 303, message recommender 104 detects a tense (e.g., past tense, present tense, future tense) of the post directed to the identified topic. In one embodiment, message recommender 104 determines the tense of the post based on identifying keywords using natural language processing, such as "am going" or "will go" for the future tense, "I go," for the present tense and "went to" or "was at" for the past tense. For example, suppose the user (e.g., user of client 101A) posts the message "I am going to Jane's on Tuesday." Such a post is directed to the future tense based on using the language of "am going." Furthermore, the topic of going to Jane's house may be deduced in step 302 based on the phrase "going to Jane's."

In step 304, message recommender 104 extracts any time-related information from the post and sets a reminder at a particular time for the user (e.g., user of client device 101A) to post a subsequent message updating the post. For instance, referring to the above example, in the post "I am going to Jane's on Tuesday," the term "Tuesday" is detected by message recommender 104 using natural language processing which indicates a future day to go to Jane's house. Time-related information, such as the day of the week or a particular time may be detected by message recommender 104 by focusing on keywords, such as the day of the week or a designated time using natural language processing. Such information may be used by message recommender 104 to set a reminder for the user to post a subsequent message updating the post. For example, a reminder may be set by message recommender 104 for the user to post a subsequent message updating the post ("I am going to Jane's on Tuesday) on Tuesday.

In step 305, message recommender 104 monitors for time based and user triggered events. "Time based events," as used herein, refer to events that cause message recommender 104 to recommend or suggest to the user a message to post to a social network based on a prior post(s) at a particular day/time based on the extracted time-related information in step 304. For instance, referring to the above example, message recommender 104 will recommend a message to be posted to the social network based on the post "I am going to Jane's on Tuesday" on Tuesday since that is the day that the user is supposed to be going to Jane's house.

"User triggered events," as used herein, refer to actions performed by the user that involve posting an update to a previous post that may necessitate message recommender 104 to recommend or suggest to the user (e.g., user of client device 101A) a message to be posted to the social network to clarify the update. For example, if the user posts the message "I am going to Jane's on Tuesday" and posts an update to this message by stating "I am at Jane's with Sue," message recommender 104 may first determine that such posts are associated with one another based on the time of the posts (e.g., post of "went with Sue" was posted on Tuesday) as well as based on using similar keywords in the posts (e.g., Jane's) using natural language processing. As will be discussed in further detail below, the phrase "I am going to Jane's on Tuesday" is directed to a future tense and the phrase "I am at Jane's with Sue" is directed to a present tense. It may be desired to provide a past/present/future pair of posts. Hence, message recommender 104 may recommend the message "I was at Jane's with Sue" directed to the past tense to the user to be posted to the social network thereby providing a more complete view of the user's personal history.

In step 306, message recommender 104 transforms the post in the tense detected in step 303 to a suggested post of a second tense directed to the same topic (topic identified in step 302) to the user (e.g., user of client device 101A) using natural language processing in response to a time based or a user triggered event. For example, the post of "I am going to Jane's on Tuesday" may be transformed to "I am at Jane's" in response to the day being Tuesday (time based event). Such a post may be generated by message recommender 104 using natural language processing by using the same keywords in the first post but using a different tense.

In step 307, message recommender 104 presents the suggested post to the user (e.g., user of client device 101A) as a recommended message to be posted to the social network.

In step 308, a determination is made by message recommender 104 as to whether the user makes any modifications to the suggested message to be posted to the social network.

If the user makes any modifications to the suggested message to be posted to the social network, then, in step 309, message recommender 104 posts the suggested message with the modifications provided by the user. For example, the user may modify the suggested message of "I am at Jane's" to become "I am at Jane's with Sue."

If, however, the user does not make any modifications to the suggested message to be posted to the social network, then, in step 310, message recommender 104 posts the suggested message without any modifications.

Referring to FIG. 3B, in conjunction with FIGS. 1-2, upon posting the suggested message with or without modifications in steps 309, 310, in step 311, message recommender 104 associates the posts directed to the same topic in the two tenses (e.g., future and present) and sets a reminder at a particular time for the user (e.g., user of client device 101A) to post a subsequent message updating the posts. For example, the posts of "I am going to Jane's on Tuesday" and "I am at Jane's with Sue" may be associated with one another since they are both directed to the same topic (going to Jane's house) which may be determined based on identifying keywords (e.g., "Jane's") using natural language processing. Message recommender 104 may set a reminder for the following day (Wednesday) to post a subsequent message updating these posts. In one embodiment, posts may be associated based on a likelihood of being associated. Such a likelihood may be determined based on using similar keywords which are identified using natural language processing.

In step 312, message recommender 104 continues to monitor for time based and user triggered events as discussed above.

In step 313, message recommender 104 generates a suggested post to the user (e.g., user of client device 101A) directed to the identified topic (topic identified in step 302) in a third tense (e.g., past tense) based on posts directed to the identified topic in the first and second tenses (e.g., future and present tenses) using natural language processing thereby forming a past/present/future pairing of posts in response to a time based or a user triggered event. For example, message recommender 104 may generate a suggested message of "I was at Jane's with Sue" (past tense) based on the posts of "I am going to Jane's on Tuesday" (future tense) and "I am at Jane's with Sue" (present tense). Such a post may be generated by message recommender 104 using natural language processing by using the same keywords in the posts directed to the two tenses but with a different tense. As a result, such a suggested post is a restatement of the posts in the other two tenses.

By forming a past/present/future pairing of posts, a more complete view and understandable view of the user's personal history may be obtained.

In one embodiment, the present invention may implement a rewards system for encouraging users to post healthy lifecycles of past/present/future pairing of posts.

In step 314, message recommender 104 presents the suggested post to the user (e.g., user of client device 101A) as a recommended message to be posted to the social network.

In step 315, a determination is made by message recommender 104 as to whether the user makes any modifications to the suggested message to be posted to the social network.

If the user makes any modifications to the suggested message to be posted to the social network, then, in step 316, message recommender 104 posts the suggested message with the modifications provided by the user. For example, the user may modify the suggested message of "I was at Jane's with Sue" to become "I was at Jane's with Sue, and it was a blast."

If, however, the user does not make any modifications to the suggested message to be posted to the social network, then, in step 317, message recommender 104 posts the suggested message without any modifications.

In one embodiment, metadata concerning the linkages between the past/present/future pairing of posts may be obtained and utilized in analytic systems to determine or mine user patterns (e.g., the user's patterns in the types of messages posted, when the messages are posted, to whom the messages are posted, etc.) to determine the user's behavior.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for improving the quality of posts in a social network, the method comprising:

monitoring, by a message recommender system, posts posted in a social network environment;

identifying, by said message recommender system, a topic of a first post from said monitored posts, wherein said topic is a subject of a conversation or discussion in said first post;

detecting, by said message recommender system, a first tense of said first post directed to said topic;

extracting, by said message recommender system, time-related information from said first post and setting a reminder at a particular time for a user to post a subsequent message updating said first post;

monitoring, by said message recommender system, for time based and user triggered events, wherein said time based events are events that trigger recommending or suggesting to said user a message to post to said social network based on a prior post at a particular day/time based on said extracted time-related information, wherein said user triggered events are actions performed by said user that involve posting an update to a previous post;

transforming, by said message recommender system, said first post of said first tense to a second post of a second tense directed to said identified topic;

presenting, by said message recommender system, said second post to said user as a recommended post to be posted to said social network;

associating, by said message recommender system, said first and second posts directed to said topic in said first and second tenses, respectively, and setting a reminder at a particular time for said user to post a subsequent message updating said first and second posts;

generating, by said message recommender system, a third post directed to said topic in a third tense based on said first and second posts directed to said topic in said first and second tenses, respectively, thereby forming a past/present/future pairing of posts, wherein said third post is a restatement of said first and second posts;

presenting, by said message recommender system, said third post to said user as a recommended post to be posted to said social network; and obtaining, by said message recommender system, metadata concerning linkages between said past/present/future pairing of posts to be utilized in analytical systems to determine user patterns to determine behavior of said user.

2. The method as recited in claim 1 further comprising:
transforming said first post of said first tense to said second post of said second tense directed to said topic in response to a time based or a user triggered event.

3. The method as recited in claim 1 further comprising:
generating said third post directed to said topic in said third tense based on said first and second posts directed to said topic in said first and second tenses, respectively, in response to a time based or a user triggered event.

4. The method as recited in claim 1, wherein said topic is identified using natural language processing, wherein said first post of said first tense is transformed to said second post of said second tense using said natural language processing, wherein said third post of said third tense is generated using said natural language processing.

5. The method as recited in claim 1 further comprising:
receiving modifications to said presented second post and/or said presented third post from said user; and
posting said second post and/or said third post with said received modifications to said social network.

6. A computer program product for improving the quality of posts in a social network, the computer program product comprising a computer readable storage medium having program code embodied therewith, the program code comprising the programming instructions for:
  monitoring posts posted in a social network environment;
  identifying a topic of a first post from said monitored posts, wherein said topic is a subject of a conversation or discussion in said first post;
  detecting a first tense of said first post directed to said topic;
  extracting time-related information from said first post and setting a reminder at a particular time for a user to post a subsequent message updating said first post;
  monitoring for time based and user triggered events, wherein said time based events are events that trigger recommending or suggesting to said user a message to post to said social network based on a prior post at a particular day/time based on said extracted time-related information, wherein said user triggered events are actions performed by said user that involve posting an update to a previous post;
  transforming said first post of said first tense to a second post of a second tense directed to said identified topic;
  presenting said second post to said user as a recommended post to be posted to said social network;
  associating said first and second posts directed to said topic in said first and second tenses, respectively, and setting a reminder at a particular time for said user to post a subsequent message updating said first and second posts;
  generating a third post directed to said topic in a third tense based on said first and second posts directed to said topic in said first and second tenses, respectively, thereby forming a past/present/future pairing of posts, wherein said third post is a restatement of said first and second posts;
  presenting said third post to said user as a recommended post to be posted to said social network; and
  obtaining metadata concerning linkages between said past/present/future pairing of posts to be utilized in analytical systems to determine user patterns to determine behavior of said user.

7. The computer program product as recited in claim 6, wherein the program code further comprises the programming instructions for:
  transforming said first post of said first tense to said second post of said second tense directed to said topic in response to a time based or a user triggered event.

8. The computer program product as recited in claim 6, wherein the program code further comprises the programming instructions for:
  generating said third post directed to said topic in said third tense based on said first and second posts directed to said topic in said first and second tenses, respectively, in response to a time based or a user triggered event.

9. The computer program product as recited in claim 6, wherein said topic is identified using natural language processing, wherein said first post of said first tense is transformed to said second post of said second tense using said natural language processing, wherein said third post of said third tense is generated using said natural language processing.

10. The computer program product as recited in claim 6, wherein the program code further comprises the programming instructions for:
  receiving modifications to said presented second post and/or said presented third post from said user; and
  posting said second post and/or said third post with said received modifications to said social network.

11. A system, comprising:
  a memory unit for storing a computer program for improving the quality of posts in a social network; and
  a processor coupled to the memory unit, wherein the processor is configured to execute the program instructions of the computer program comprising:
    monitoring posts posted in a social network environment;
    identifying a topic of a first post from said monitored posts, wherein said topic is a subject of a conversation or discussion in said first post;
    detecting a first tense of said first post directed to said topic;
    extracting time-related information from said first post and setting a reminder at a particular time for a user to post a subsequent message updating said first post;
    monitoring for time based and user triggered events, wherein said time based events are events that trigger recommending or suggesting to said user a message to post to said social network based on a prior post at a particular day/time based on said extracted time-related information, wherein said user triggered events are actions performed by said user that involve posting an update to a previous post;
    transforming said first post of said first tense to a second post of a second tense directed to said identified topic;
    presenting said second post to said user as a recommended post to be posted to said social network;
    associating said first and second posts directed to said topic in said first and second tenses, respectively, and setting a reminder at a particular time for said user to post a subsequent message updating said first and second posts;
    generating a third post directed to said topic in a third tense based on said first and second posts directed to said topic in said first and second tenses, respectively, thereby forming a past/present/future pairing of posts, wherein said third post is a restatement of said first and second posts;
    presenting said third post to said user as a recommended post to be posted to said social network; and
    obtaining metadata concerning linkages between said past/present/future pairing of posts to be utilized in analytical systems to determine user patterns to determine behavior of said user.

12. The system as recited in claim 11, wherein the program instructions of the computer program further comprises:
  transforming said first post of said first tense to said second post of said second tense directed to said topic in response to a time based or a user triggered event.

13. The system as recited in claim 11, wherein the program instructions of the computer program further comprises:
  generating said third post directed to said topic in said third tense based on said first and second posts directed to said topic in said first and second tenses, respectively, in response to a time based or a user triggered event.

14. The system as recited in claim 11, wherein the program instructions of the computer program further comprises:

receiving modifications to said presented second post and/or said presented third post from said user; and posting said second post and/or said third post with said received modifications to said social network.

15. The system as recited in claim 11, wherein said topic is identified using natural language processing, wherein said first post of said first tense is transformed to said second post of said second tense using said natural language processing, wherein said third post of said third tense is generated using said natural language processing.

\* \* \* \* \*